United States Patent
Du

(10) Patent No.: US 9,164,927 B2
(45) Date of Patent: Oct. 20, 2015

(54) INTEGRATED CIRCUIT AND MEMORY DATA PROTECTION APPARATUS AND METHODS THEREOF

(75) Inventor: Morgan Du, Keelung (TW)

(73) Assignee: Nuvoton Technology Corporation, Hsinchu (TW)

( * ) Notice: Subject to any disclaimer, the term of this patent is extended or adjusted under 35 U.S.C. 154(b) by 1465 days.

(21) Appl. No.: 12/482,439

(22) Filed: Jun. 10, 2009

(65) Prior Publication Data

US 2010/0199096 A1    Aug. 5, 2010

(30) Foreign Application Priority Data

Feb. 5, 2009    (TW) .............................. 98103670 A

(51) Int. Cl.
| | | |
|---|---|---|
| G06F 9/00 | (2006.01) | |
| G06F 15/177 | (2006.01) | |
| G06F 21/00 | (2013.01) | |
| G06F 12/14 | (2006.01) | |
| G06F 21/62 | (2013.01) | |
| G06F 21/78 | (2013.01) | |
| H04L 9/32 | (2006.01) | |
| H04L 9/00 | (2006.01) | |

(52) U.S. Cl.
CPC ........ *G06F 12/1441* (2013.01); *G06F 12/1408* (2013.01); *G06F 21/6218* (2013.01); *G06F 21/78* (2013.01); *H04L 9/3247* (2013.01); *H04L 9/006* (2013.01); *H04L 9/3263* (2013.01); *H04L 9/3294* (2013.01); *H04L 2209/60* (2013.01)

(58) Field of Classification Search
None
See application file for complete search history.

(56) References Cited

U.S. PATENT DOCUMENTS

| | | | |
|---|---|---|---|
| 5,968,136 A * | 10/1999 | Saulpaugh et al. ................ 710/3 |
| 6,594,240 B1 * | 7/2003 | Chuah et al. .................. 370/328 |
| 6,947,954 B2 * | 9/2005 | Cohen et al. ........................... 1/1 |
| 6,968,478 B1 * | 11/2005 | Edwards et al. ................ 714/32 |
| 2003/0126458 A1 * | 7/2003 | Teramoto et al. ............. 713/194 |
| 2008/0112332 A1 * | 5/2008 | Pepper .......................... 370/250 |
| 2008/0178257 A1 * | 7/2008 | Mishina et al. ................... 726/2 |
| 2009/0044021 A1 * | 2/2009 | Buck ............................ 713/178 |

FOREIGN PATENT DOCUMENTS

| | | |
|---|---|---|
| CN | 1265494 | 9/2000 |
| CN | 1610886 | 4/2005 |

OTHER PUBLICATIONS

"First Office Action of China Counterpart Application", issued on Mar. 23, 2011, p. 1-p. 10.

* cited by examiner

*Primary Examiner* — Azizul Choudhury
(74) *Attorney, Agent, or Firm* — Jianq Chyun IP Office

(57) ABSTRACT

A memory data protection apparatus including a storage device, a cipher, and a validator is provided. The storage device is embedded in a chip electrically coupled to an external memory for storing an offset value, a signature and a key. The cipher electrically coupled to the storage device and the external memory to receive the key includes an encrypter and a decrypter. The encrypter is capable of executing an encryption to output an encrypted data and an encrypted certified data. The decrypter is capable of executing a decryption to output a decrypted data. The validator electrically coupled to the storage device receives the signature, the offset value and the certified data and determines an access limit of the external memory by validating the certified data with the signature and the offset value. The memory data protection apparatus accesses an original data in the external memory according to the access limit.

12 Claims, 2 Drawing Sheets

INTEGRATED CIRCUIT AND MEMORY DATA PROTECTION APPARATUS AND METHODS THEREOF

CROSS-REFERENCE TO RELATED APPLICATION

This application claims the priority benefit of Taiwan application serial no. 98103670, filed Feb. 5, 2009. The entirety of the above-mentioned patent application is hereby incorporated by reference herein and made a part of specification.

FIELD OF THE INVENTION

The present invention generally relates to a memory data protection apparatus and a method thereof. In particular, the present invention relates to a memory data protection apparatus for protecting data stored in an external memory and a method thereof.

DESCRIPTION OF RELATED ART

In an embedded system, a central processor in a system-on-a-chip is configured to execute a program code stored in a built-in memory. To prevent the program code from being read or copied without permission, data embedded in the built-in memory can not be retrieved through any interface on the system-on-a-chip when it is locked. The only way to release the lock state is to clean the data in the built-in memory.

However, with the improving function of the electric products day by day, the size of the executed program code required by the system-on-a-chip is larger and larger. Therefore, an external memory is recently selected to be the memory used for storing the program code. Nonetheless, the program code stored in the external memory is read easily by others and unlocked since the external memory is independent from the system-on-a-chip. For example, the person in related art may use compiling technology to unlock it. Accordingly, a designer's endeavor is in vain.

The way to lock the program code applied to the built-in memory of the system-on-a-chip in the related art can not be applied to the external memory of the system-on-a-chip. Accordingly, it becomes an important issue to provide a protection mechanism for effectively protecting the data stored in the external memory outside of the system-on-a-chip.

SUMMARY OF THE INVENTION

According to an embodiment of the present invention, a memory data protection apparatus is provided. The memory data protection apparatus includes a storage device, a cipher and a validator. The storage device is embedded in a chip electrically coupled to an external memory for storing an offset value, a signature and a key. The cipher is electrically coupled to the storage device and the external memory for receiving the key. The cipher includes an encrypter and a decrypter. The encrypter is capable of receiving an original data and a certified data, and encrypting the original data and the certified data according to the key so as to output an encrypted data and an encrypted certified data to the external memory. The decrypter is capable of reading the encrypted data and the encrypted certified data stored in the external memory, and decrypting the encrypted data and the encrypted certified data according to the key so as to output a decrypted data. The validator is electrically coupled to the storage device and receives the signature, the offset value and the certified data. The validator determines an access limit of the external memory by validating the certified data with the signature and the offset value. The memory data protection apparatus accesses the original data in the external memory according to the access limit.

According to another embodiment of the present invention, a chip is provided. The chip includes the memory data protection apparatus described in the above embodiment and a memory. The memory is capable of storing the decrypted data transmitted by the decrypter.

According to another embodiment of the present invention, a method for protecting data stored in an external memory electrically coupled to a chip is provided. First, an offset value, a signature and a key are stored in a storage device. Next, a certified data is received. Whether the certified data conforms to the signature and the offset value mentioned above is validated so as to determine an access limit of an external memory. Thereafter, an original data in the external memory is accessed according to the access limit and an encryption or a decryption is executed to the original data according to the key.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
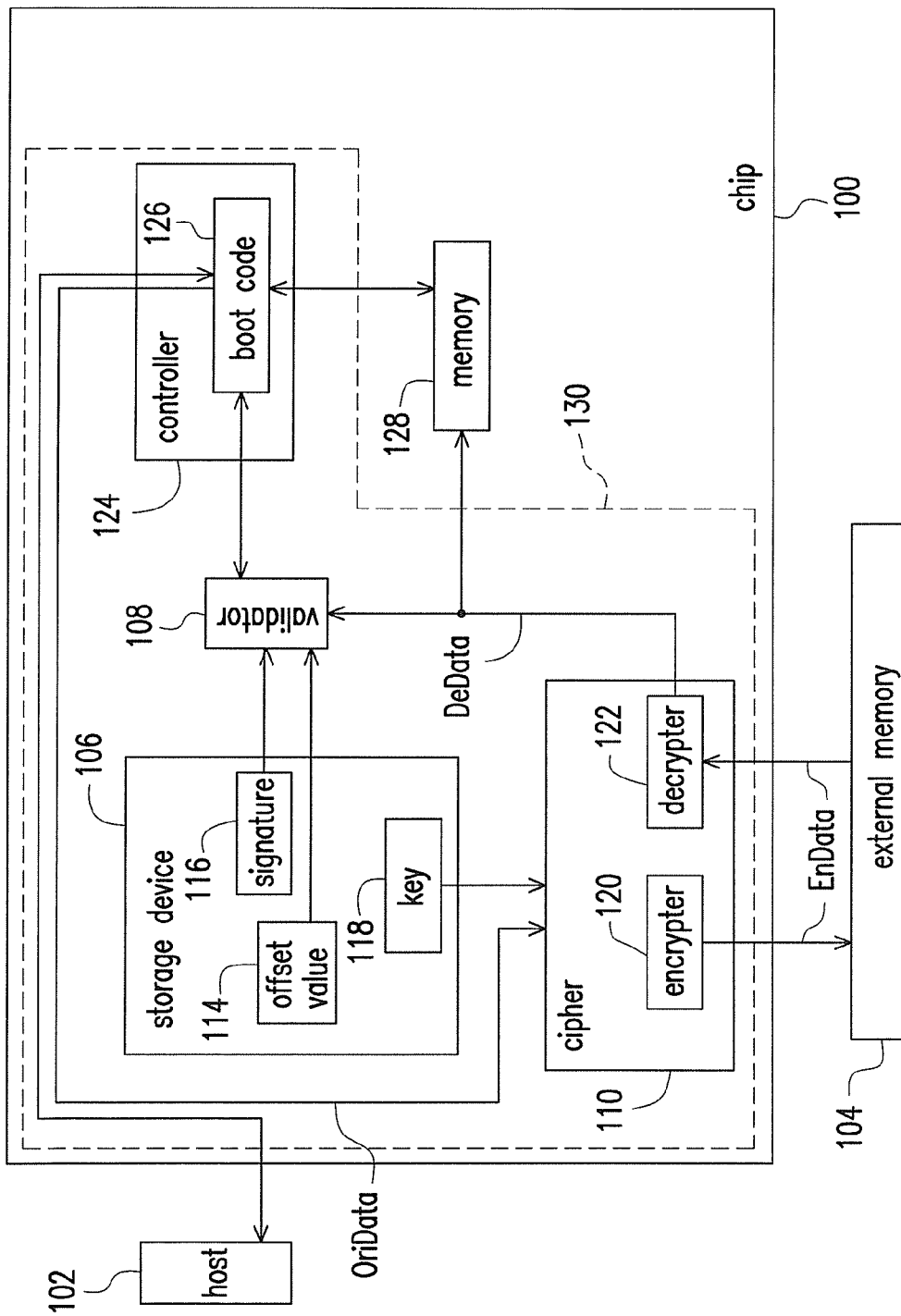
FIG. 1 is a block diagram of a memory data protection apparatus according to an embodiment of the present invention.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, a block diagram of a data protection system according to an embodiment of the present invention is shown. The data protection system can include a host 102, a chip 100, and an external memory 104. The chip 100 may be electrically coupled between the host 102 and the external memory 104. The external memory 104, for example, can be a flash memory. The chip 100 can include a memory data protection apparatus 130 and a memory 128. The memory 128 can be a static random access memory (SRAM) or a cache memory (Cache).

The memory data protection apparatus 130 can include a storage device 106, a cipher 110, and a validator 108. The storage device 106 can be a non-volatile memory such as a one time program (OTP) memory, an erasable programmable read only memory (EPROM) or a flash memory for storing a signature 116, an offset value 114 and a key 118.

The cipher 110 is electrically coupled to the storage device 106. The cipher is capable of receiving the key 118 and an original data OriData. In particular, the cipher 110 can include an encrypter 120 and a decrypter 122. The encrypter 120 not only can receive the original data OriData but also can receive a certified data (not shown). Besides, the encrypter 120 encrypts the original data OriData and the certified data according to the key 118 and then outputs an encrypted data EnData and an encrypted certified data (not shown) to the external memory 104. The above certified data can be a data containing a signature and separated from the original data OriData. The certified data also can be a data combined with the original data OriData and located in the former area of the original data OriData, e.g. it can be located in the former 128K bytes of the original data OriData. The decrypter 122 is capable of reading the encrypted data EnData and the encrypted certified data stored in the external memory 104, and decrypting the encrypted data EnData and the encrypted certified data according to the key 118 so as to output a decrypted data DeData and the certified data.

The cipher 110 described above can be disable. For instance, the cipher 110 can be disable by the controller 124 when the chip 100 is initialized or the functions of encryption and decryption are cancelled. Thus, the data passing through the cipher 110 would not be encrypted and decrypted. Further, in consideration of data confidentiality, the cipher 110 can be set not to be further turned on after it is turned off, unless the chip 100 is reset.

The validator 108 is electrically coupled to the storage device 106 and the cipher 110. The validator is capable of receiving the signature 116, the offset value and the certified data, e.g. the signature and the offset value transmitted from the host 102 or from the external memory 104, to determine the access limit of the external memory 104 by validating the certified data with the signature 116 and the offset value 114.

Further referring to FIG. 1, the memory data protection apparatus 130 can further include a controller 124, and the controller 124 includes a boot code 126. The controller 124 can execute the boot code 126 therein to provide a plurality of functions. For example, the host 102 executes the boot code 126 through the controller 124 such that the memory data protection apparatus 130 can provide various interfaces to connect with the host 102. The interface can be a universal serial bus (USB) or a universal asynchronous receiver/transmitter (UART). In addition, the execution of the boot code 126 also enables the data stored in the external memory 104 to be read, enables the data stored in the storage device 106 or the external memory 104 to be erased, or enables the offset value 114, the signature 116 and the key 118 to be written into the storage device 106.

Referring to FIG. 1, to enforce data confidentiality, the storage device 106 can be set not to be read directly by the controller 124. Thus, the offset value 114 and the signature 116 in the storage device 106 are prevented from being read by the controller 124. The controller 124 can be electrically coupled to the validator 108. In the situation that the storage device 106 can not be directly read by the controller 124, the validator 108 can provide the following three modes respectively to the controller 124: (1) whether the storage device 106 is written or not; (2) when the storage device 106 has been written, whether the contents in the external memory 104 validated according to the offset value 114 and the signature 116 are valid or not; (3) when the storage device 106 has been written, and the data are transmitted by the boot code 126 to the validator 108, whether the data validated according to the signature 116 and the offset value 114 by the validator 108 is valid or not. If the storage device 106 is not written (mode 1), the controller 124 executes the boot code 126 and writes the offset value 114, the signature 116 and the key 118 into the storage device 106.

To further describe the embodiments of the present invention, the flow of the data protection of the above memory data protection apparatus 130 applied in the chip 100 is described as an example in the following, wherein the elements mentioned in the flow can be referred to as those indicated FIG. 1.

Software Developing Stage

During the software developing stage, the data stored in the external memory 104 such as the program code can not be protected and the storage device 106 is not written by any data. Thus, the cipher 110 is disable and the data can be directly written from the host 102 into the external memory 104 through the chip 100. The controller 124 does not decode during executing or reading the contents of the external memory 104.

Testing or Mass Production Stage

The key 118, the offset value 114 and the signature 116 are transmitted from the host 102 into the chip 100. The signature 116 can be located in the former area of the original data OriData, e.g., in the former 128K bytes. The original data OriData can be the data to be protected, such as the program codes. The offset value 114 can be the address of the signature 116. Next, the boot code 126 uses the validator 108 to make sure that the storage device 106 is not written by any data, and then writes the key 118, the offset value 114 and the signature 116 into the storage device 106. If any other data has been written into the above storage device 106, the boot code 126 can report an error message back to the host 102.

Thereafter, the boot code 126 writes the certified data, e.g., the signature, and the original data OriData which is the to-be-protected data such as the program codes into the external memory 104. The encrypter 120 in the cipher 110 executes an encryption on the data and the signature written in the external memory 104 according to the key 118 if the storage device 106 has been written. Later, the boot code 126 may optionally read the data in the external memory 104 to certify whether the data writing is done or not.

Refreshing the Data in the External Memory 104

The host 102 can transmit the certified data (e.g. the signature) in the refreshed data into the chip 100. The boot code 126 transmits the certified data to the validator 108. The certified data is compared to the offset value 114 and the signature 116 in the storage device 106. If the certified data is not conformed to the signature 116 and the offset value 114, an error message is reported back to the host 102. If the signature 116 and the offset value 114 conform to each other, the certified data is written into the external memory 104. The other data is then transmitted to the chip 100. The boot code 126 writes the data in to the external memory 104 continuously until the process is done. Thereafter, the boot code 126 optionally reads the data in the external memory 104 to certify whether the data-writing is done or not.

Executing Program

The boot code 126 can be executed after the chip 100 is charged or reset, and is ready to check the external memory 104 after confirming that it is not connected to the host 102. The boot code 126 notifies the validator 108 to read the certified data (e.g. the signature and the offset value in the external memory 104) to confirm that the signature and the signature address (i.e., the offset value) in the external memory 104 conform to the signature 116 and the offset value 114 in the storage device 106. The validator 108 thus notifies the controller 124 whether the signature is valid. If the signature is invalid, the process is suspended. If the signature is valid, the boot code 126 passes on the executing right of the controller 124 to the program in the external memory 104.

Therefore, the above-mentioned offset value 114 and signature 116 are set for preventing the data stored in the external memory 104 from being tampered and for ensuring the ability of refreshing. If it is not necessary to refresh the data, the signature 116 can be the checksum or the cyclic redundancy check (CRC) to increase the difficulty of tampering data.

Referring to FIG. 1 again, to improve the executing efficiency, the memory 128 can be further set between the cipher 110 and the controller 124. The memory 128 is capable of storing the decrypted data DeData transmitted from the decrypter 122. Accordingly, a section of the program code requiring sufficient effectiveness or other decrypted data DeData can be loaded into the memory 128, and the executing efficiency of the controller 124 can be improved by reading the memory 128. The section of the program code which is decrypted and loaded in the memory 128 can be erased by using the controller to execute the boot code 126 when the chip 100 is reset. Thereby, it can prevent foregoing program code from being divulged.

In addition, to further improve the efficiency of the data protection in the chip, a power setting pin (not shown) can be set additionally. The power setting pin can be switched between normal type and the in-circuit emulator (ICE) type. When the power setting pin is switched to the normal type, the ICE can not connect the chip 100. When the power setting pin is switched to the ICE type, the contents of the memory 128 can be cleaned by hardware circuits such as Built-in Self-Test (BIST), and the storage device 106 is disabled so as to prevent the program code or other data from being divulged.

Figure 2:
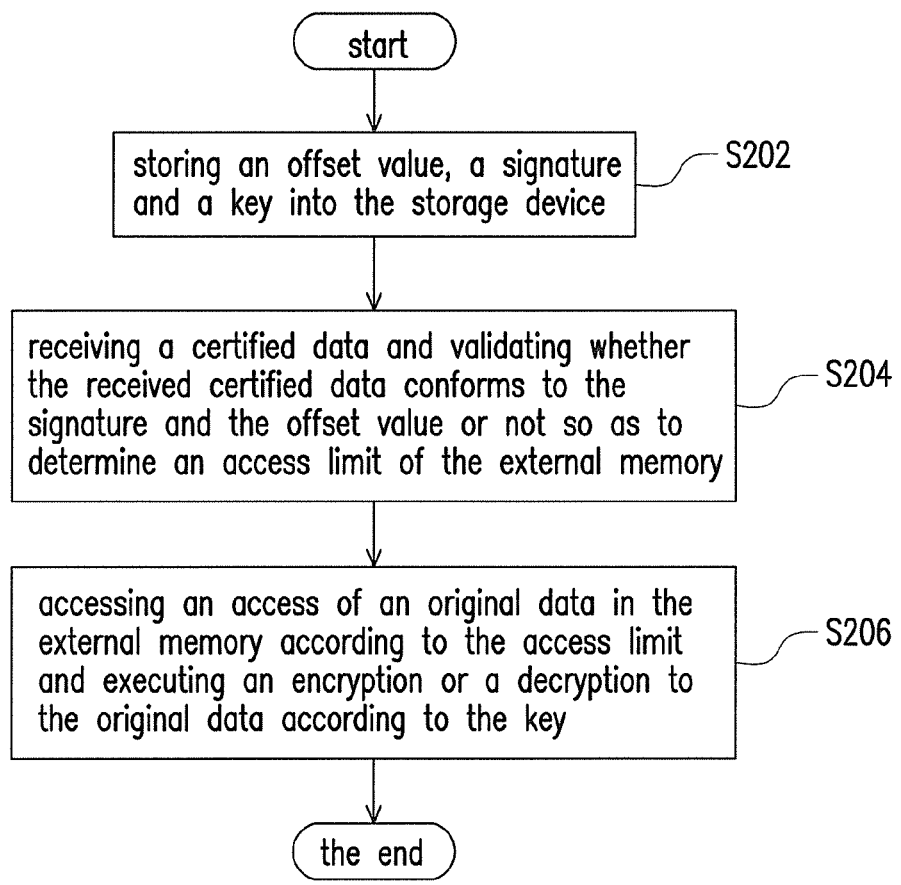
FIG. 2 illustrates steps of a memory data protection method according to an embodiment of the present invention.

FIG. 2 illustrates steps of a memory data protection method according to an embodiment of the present invention. The elements mentioned in the steps are indicated in FIG. 1. Referring to FIG. 2, in the step S202, the offset value 114, the signature 116 and the key 118 are stored into the storage device 106 first. Next, in the step S204, the certified data is received. Whether the received certified data conforms to the foregoing offset value 114 and the foregoing signature 116 is validated so as to determine an access limit of the external memory 104. Thereafter, the original data OriData in the external memory 104 is accessed according to the access limit. Further, in the step S206, the encryption or the decryption can be executed to the original data OriData according to the key 118. In addition, the steps of the memory data protection method further include checking whether the storage device 106 is written or not.

In particular, the foregoing certified data can be located in the former area of the original data OriData. The original data OriData can be a program code. The certified data include the to-be-certified signature and the to-be-certified signature offset value (the address of the to-be-certified signature). When the original data OriData is accessed, the certified data in the original data OriData is transmitted to the validator 108 to be validated. The validator 108 compares the contents of the to-be-certified signature with the signature 116, and compares the to-be-certified signature offset value with the offset value 114. In addition, when the original data OriData is encrypted or decrypted according to the key 118, the certified data can also be encrypted or decrypted at the same time because the certified data is located in the former area of the original data OriData.

Referring to FIG. 2, when the data in the external memory 104 is going to be read, the certified data received in the step S204 is transmitted from the external memory 104. The above-mentioned certified data is decrypted by the decrypter 122. The to-be-certified signature and the to-be-certified signature offset value in the certified data are compared with the signature 116 and the offset value 114 through the validator 108. When the results of the comparison represent that compared values are conformed, the access limit is then determined to be readable. When the access limit is readable, the encrypted data EnData stored in the external memory 104 is read and decrypted according to the key 118 so as to obtain the original data OriData.

Referring to FIG. 2 again, when the data in the external memory 104 is going to be written, the certified data received in the step S204 is transmitted from the host 102. The validator 108 validates the to-be-certified signature and the to-be-certified signature offset value of the certified data with the signature 116 and the offset value 114. When the results of the comparison represent that compared values are conformed, the access limit is then determined to be writable. When the access limit is writable, the encrypter 120 executes an encryption to the original data OriData according to the key 118 to obtain the encrypted data EnData, and writes the encrypted data EnData into the external memory 104.

As described above, the chip, the memory data protection apparatus thereof and the protection method thereof provided in the embodiments of the present invention are capable of using the offset value, the signature and the key stored in the storage device, and the encrypter and the decrypter in the cipher to protect the data stored in the external memory from being divulged.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A memory data protection apparatus comprising:
a storage device, embedded in a chip electrically coupled to an external memory, for storing an offset value, a signature and a key;
a cipher, electrically coupled to the storage device and the external memory, for receiving the key, wherein the cipher comprises:
an encrypter, receiving an original data and a certified data, and encrypting the original data and the certified data according to the key so as to output an encrypted data and an encrypted certified data to the external memory; and
a decrypter, reading the encrypted data and the encrypted certified data stored in the external memory, and decrypting the encrypted data and the encrypted certified data according to the key so as to output a decrypted data and the certified data;
a validator electrically coupled to the storage device, receiving the signature, the offset value and the certified data, and determining an access limit of the external memory by validating the certified data with the signature and the offset value; and
a controller including a boot code, the controller executing the boot code for checking whether the storage device is written or not via validator, and writing the offset value, the signature and the key into the storage device when the storage device is not written,
wherein the validator compares the certified data transmitted from a host with the signature and the offset value, and when the certified data conforms to the signature and the offset value, the boot code is executed to clean contents of the external memory and store the certified data and the original data transmitted from the host into the external memory,
wherein the validator compares the certified data with the signature and the offset value, so as to determine the access limit of the external memory,
wherein the memory data protection apparatus accesses the external memory according to the access limit.

2. The memory data protection apparatus according to claim 1, wherein the validator compares the certified data transmitted from a host with the signature and the offset value, and the validator determines that the access limit is writable when the certified data conforms to the signature and the offset value.

3. The memory data protection apparatus according to claim 1, wherein the validator compares the certified data transmitted from the external memory with the signature and the offset value, and the validator determines that the access limit is readable when the certified data conforms to the signature and the offset value.

4. The memory data protection apparatus according to claim 1, wherein the validator compares the certified data transmitted from the external memory with the signature and the offset value, the original data is a program code, and when the certified data conforms to the signature and the offset value, the boot code passes an executing right of the controller on to the program code of the external memory.

5. The memory data protection apparatus according to claim 1, wherein the storage device is a non-volatile memory.

6. The memory data protection apparatus according to claim 5, wherein the non-volatile memory is a one time program memory, an erasable programmable read only memory or a flash memory.

7. The memory data protection apparatus according to claim 1, wherein the offset value is a fixed value.

8. The memory data protection apparatus according to claim 1, wherein the offset value is an address of the signature.

9. A chip comprising:
a memory data protection apparatus comprising:
a storage device, embedded in the chip electrically coupled to an external memory, for storing an offset value, a signature and a key;
a cipher, electrically coupled to the storage device and the external memory, for receiving the key, wherein the cipher comprises:
an encrypter, receiving an original data and a certified data, and encrypting the original data and the certified data according to the key so as to output an encrypted data and an encrypted certified data to the external memory; and
a decrypter, reading the encrypted data and the encrypted certified data stored in the external memory, and decrypting the encrypted data and the encrypted certified data according to the key so as to output a decrypted data and the certified data;
a validator electrically coupled to the storage device, receiving the signature, the offset value and the certified data, and determining an access limit of the external memory by validating the certified data with the signature and the offset value, wherein the validator compares the certified data with the signature and the offset value, so as to determine the access limit of the external memory;
a controller, wherein the controller reads the decrypted data, when the certified data is transmitted from the external memory and the validator confirms that the certified data conforms to the signature and the offset value, and the controller comprises a boot code, the decrypted data is a program code, and the boot code passes an executing right of the controller on to the program code; and
a memory for storing the decrypted data transmitted from the decrypter,
wherein the memory data protection apparatus accesses the external memory according to the access limit.

10. The chip according to claim 9, wherein the memory is a static random access memory or a cache memory.

11. The chip according to claim 9, wherein the offset value is a fixed value.

12. The chip according to claim 9, wherein the offset value is an address of the signature.

* * * * *